(12) United States Patent
Yoshida

(10) Patent No.: US 6,323,940 B1
(45) Date of Patent: Nov. 27, 2001

(54) DISTANCE MEASUREMENT SYSTEM

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/405,174

(22) Filed: Sep. 24, 1999

(30) Foreign Application Priority Data

Sep. 29, 1998 (JP) .................................................. 10-275598

(51) Int. Cl.[7] .............................. G01C 3/08; G03B 13/00
(52) U.S. Cl. .......................... 356/3.04; 396/106; 396/120
(58) Field of Search .................................. 396/106, 120; 356/3.04–3.07

(56) References Cited

U.S. PATENT DOCUMENTS 5,493,362 * 2/1996 Nonaka .
5,659,387   8/1997 Yoshida ............................... 356/4.01
5,832,324 * 11/1998 Shimizu et al. ....................... 396/106

FOREIGN PATENT DOCUMENTS 7181038   7/1995 (JP) .

* cited by examiner

Primary Examiner—Stephen C. Buczinski
(74) Attorney, Agent, or Firm—Leydig, Voit & Mayer, Ltd.

(57) ABSTRACT

In a distance measuring system in a camera including an integrating unit having an integrating capacitor, if the period of a second integration exceeds a maximum period, a CPU stops the second integration. Furthermore, the CPU informs a photographer that the distance measurement has not performed successfully by issuing an alarm, urging the photographer to take proper action. As the CPU determines the distance to the object to be measured based on the maximum period of the second integration, error in the distance measurement may be minimized.

6 Claims, 4 Drawing Sheets

DISTANCE MEASUREMENT SYSTEM

BACKGROUND OF THE INVENTION

1. Field of the Invention

The present invention relates to a system for measuring a distance to an object to be measured and more particularly to an active distance measurement system favorably applied to various types of cameras.

2. Related Background Art

Such an active distance measurement system applied to cameras generally includes an infrared-emitting diode (IRED) for emitting an infrared beam toward an object to be measured, and a position sensitive detector (PSD) for receiving the object-reflected infrared beam. The signal output from the PSD is a signal responsive to a position where the object-reflected infrared beam is received. A signal processing and arithmetic unit determines a distance to the object to be measured from this signal. Because a large error may occur at once measurement, averaging of multiple pieces of distance information is generally performed to obtain more accurate distance information.

FIG. 4 shows a circuit diagram illustrating a configuration of an integrating unit used for obtaining the average of the distance information in the distance measurement system. This integrating unit 16 comprises a switch 1, an integrating capacitor 2, a switch 3, a constant current source 4, an operational amplifier 5, a switch 6, a reference power source 7, and a comparator 8. The negative input terminal of the operational amplifier 5 is connected through the switch 1 to the output terminal of an arithmetic unit 15 and grounded through the integrating capacitor 2. Furthermore the negative input terminal of the operational amplifier 5 is connected through the switch 3 to the constant current source 4, and connected through the switch 6 to the output terminal of the operational amplifier 5. Also, the positive input terminal of the operational amplifier 5 is connected to the reference power source 7, which provides a reference voltage $V_{REF}$. The comparator 8 is connected to the junction between the negative terminal of the operational amplifier 5 and the integrating capacitor 2 and compares the potential of the junction and the reference voltage $V_{REF}$ to find out which is higher. The comparator 8 outputs a signal corresponding to the comparison results. A central processing unit (CPU) 19 receives the signal output from the comparator 8 and controls the on-off operation of the switches 1, 3 and 6.

As an example of the distance measurement system using such an integrating unit 16 is a distance measurement system mounted in a camera. When a shutter release button is half- or partially-depressed after powering on the camera, the CPU 19 turns on the switch 6 to charge the integrating capacitor 2. As the result, the integrating capacitor 2 is charged, as generally shown in FIG. 5, to the reference voltage $V_{REF}$ provided by the reference power source 7. After the charging up, the switch 6 is turned off and retained in such a state.

Then, the IRED emits infrared pulses and the switch 1 is turned on. As a result, output signals (distance information) from the arithmetic unit 15 are input into the integrating capacitor 2 asnegative voltages. AS shown in FIG. 5, the voltage across the integrating capacitor 2 decrementally changes step by step in value corresponding to each distance measurement information. This is called a "first integrating".

After the predetermined number (e.g., 256) of negative voltage inputs (discharges) into the integrating capacitor 2 are completed, the switch 1 is turned off and the switch 3 is turned on in response to control signals from the CPU, whereby the integrating capacitor 2 is charged at a fixed speed defined by the power rating of the constant current source 4. This is called a "second integrating".

All the while of the second integrating, the comparator 8 compares the voltage level of the integrating capacitor 2 and the reference voltage $V_{REF}$. If the comparator 8 estimates that they are coincident with each other then the comparator 8 turns the switch 3 off to stop charging the integrating capacitor 2, i.e. finish the second integrating. The CPU 19 counts a charging time of capacitor 2 (length of time spent in the second integrating). As the charging speed by the constant current source 4 is uniform, the sum of the signal voltages input into the integrating capacitor 2 during the first integrating can be determined from the aforementioned charging time of capacitor 2. The distance to the object can be determined based on the resultant sum. On the basis of the obtained distance to the object, the CPU 19 controls a driving of lens to focus. In the subsequent distance measurement, as the required charging of the integrating capacitor 2 has been realized by the constant current source 4, the switch 3 may be retained open, unless the constant current source 4 is provided in use for a long time.

SUMMARY OF THE INVENTION

However, with such a distance measurement system, the charging speed of the integrating capacitor 2 with the constant current source 4 in the second integrating may change because of such as a power voltage-lowering due to battery drain. In this case, a value of distance to the object obtained based on the time required for the second integrating may be inaccurate. Furthermore, when a period required for the second integrating becomes longer, a time lag from release-button manipulation to light exposure also increases. Thus, when it is desired to shoot such as a moving subject (object to be measured), a photograph having a desired composition may not be obtained.

In order to solve the above-mentioned problems, it is an object of the present invention to provide a distance measurement system, which can detect abnormal charging speed of an integrating capacitor in the second integrating and which can perform suitable processing.

To achieve this object, the present invention supplies an active distance measurement comprising: (1) a light source for emitting a predetermined series of light pulses toward an object to be measured; (2) a position sensitive detector (PSD) for receiving object-reflected light pulses and outputting signals each corresponding to a position where the object-reflected light pulse is received; (3) an arithmetic unit for outputting signals each corresponding to the distance to the object in response to the signals output from the PSD; (4) an integrating unit including an integrating capacitor, and a comparator comparing a charged voltage in said capacitor with a predetermined reference voltage and outputting a compared signal represented compared result, said integrating unit performing a first integrating during which said integrating capacitor is discharged or charged in response to the signals output from said arithmetic unit, and a second integration during which said integrating capacitor is charged or discharged at a fixed speed until the time when the charged voltage in said integrating capacitor reaches to the predetermined reference voltage or until a predetermined maximum period elapses; and (5) a distance detection unit for detecting the distance to the object based on the period if a period of second integrating is enough to charge or discharge said integrating capacitor to the reference voltage.

With the distance measurement system according to the present invention, a series of light pulses are emitted toward the object to be measured from the light source. These pulses are reflected by the object to be measured. Such object-reflected pulses are received by the PSD. The position where the object-reflected pulse is received changes responsive to the distance to the object. The PSD outputs the signal dependent on the light-receiving position. The arithmetic unit calculates the distance to the object based on this signal and outputs the signal corresponding to the distance. The integrating unit accumulates the signals output from the arithmetic unit (first integrating) by charging or discharging the integrating capacitor in response to the output signals from the arithmetic unit. Thereafter, the integrating capacitor is charged or discharged at the constant speed (second integrating). During the second integrating, the charged voltage in the integrating capacitor is compared to the reference voltage and the compared signal represented thus comparison result is output from the integrating unit. The distance detection unit detects the distance to the object based on the signal output from the integrating unit if the period of second integrating is enough to charge or discharge the integrating capacitor to the reference voltage.

With the distance measurement system, the distance detection unit may issue the alarm signal when detected that the period for second integrating is not enough to charge or discharge the integrating capacitor to the reference voltage. This may urge the photographer to take proper action.

Furthermore, in the distance measurement system according to the present invention, if the period of second integrating is not enough to charge or discharge the integrating capacitor to the reference voltage, the distance detection unit may detect the distance to the object based on the predetermined maximum period. Alternatively, if the period of second integrating is shorter than the predetermined minimum period, the distance detection part may detect the distance to the object based on the predetermined minimum period. In any case, an error in distance measurement may be minimized.

Preferably, the distance measurement system according to the present invention may further include a charging or discharging unit, which sets the integrating capacitor to the reference voltage before performing a succeeding first integrating, when the distance detection unit has detected that the period of second integrating reaches the predetermined maximum period. In such a case, a normal distance measurement operation can be expected in the succeeding distance measurement.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
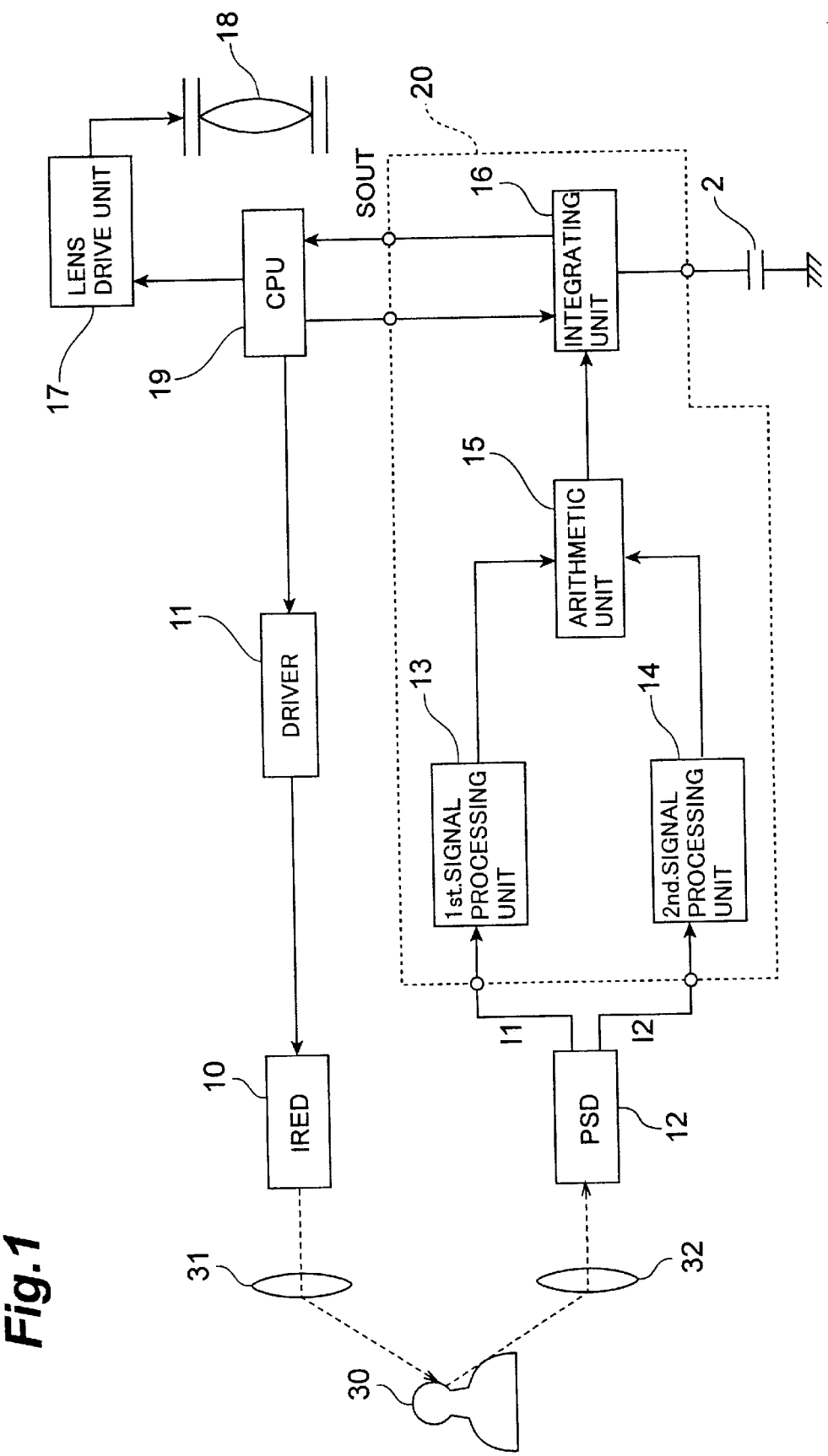
FIG. 1 is a block diagram of a distance measurement system according to a preferred embodiment of the present invention.

The embodiments according to the invention will now be described in more detail with the accompanying drawings. To facilitate the comprehension of the explanation, the same reference numerals denote the same parts, where possible, throughout the drawings, and a repeated explanation will be omitted. Although the embodiments according to the present invention are described below regarding active distance measurement systems applied as those for using in autofocus cameras, the invention is certainly not limited thereto.

FIG. 1 shows a configuration of a distance measurement system according to the embodiment of the present invention, which system comprises an infrared-emitting diode (IRED) 10 for emitting infrared light pulses through a light-projecting lens 31 to an object to be measured, a driver 11 for driving the IRED 10, and a position sensitive detector (PSD) 12 receiving through a light-receiving lens 32 the object-reflected infrared pulses.

The distance measurement system further comprises first and second signal processing units 13 and 14 for processing, respectively, signal currents $I_1$, and $I_2$ output from the PSD 12, an arithmetic unit 15 for calculating and outputting distance information of the object 30 based on the signals output from these signal processing units 13 and 14, an integrating unit 16 for integrating the distance information signal output from the arithmetic unit 15, a lens 18 for producing an image of the object 30 on an imaging film, a lens drive circuit 17 for driving the lens 18 to focus properly, and a central processing unit (CPU) 19 for controlling the whole of a camera including the above distance measurement system. In addition, it is noted that the first signal processing unit 13, second signal processing unit 14, arithmetic unit 15 and integrating unit 16 are installed in an autofocus integrated circuit (AFIC) 20 mounted in the camera.

The CPU 19 controls the whole of the distance measurement system-mounting camera based on programs and parameters preliminarily stored in a memory (not shown), such as an electrically erasable and programmable read-only memory (EEPROM). More specifically, the CPU 19 controls the driver 11 to emit the infrared pulses from the IRED 10. The CPU 19 controls the operation of the AFIC 20 and receives an SOUT signal output from the AFIC 20 to determine the distance to the object 30 based on the above SOUT signal, enabling the lens 18 to perform the focussing operation through the lens drive circuit 17. Furthermore, the CPU 19 evaluates, based on the SOUT signal output from the AFIC 20, whether or not the operation of the AFIC 20 is normal.

Under the control of the CPU 19, the IRED 10 first emits infrared light pulses through the light-projecting lens 31 toward the object 30. Thesw infrared pulses are reflected by the object 30 and the PSD 12 receives the object-reflected infrared pulses through the light-receiving lens 32. The PSD 12 outputs the signal currents $I_1$, and $I_2$ in accordance with the infrared-receiving positions. The first signal processing unit 13 receives at its input the signal current $I_1$, output from the PSD 12 and the second signal processing unit 14 receives at its input the signal current $I_1$ output from the PSD 12, each unit performing processing such as removal of a standing-light component. The arithmetic unit 15 accepts the signals output from the first and second signal processing units 13 and 14 to obtain data corresponding to an output ratio $I_1/(I_1+I_2)$ from the PSD 12, which data is output as a distance information signal.

During one distance measurement operation, the IRED 10 emits a predetermined number (e.g., 256 times) of pulses and the arithmetic unit 15 issues the distance information signals as many as pulses. Thus, the integrating unit 16 performs the integrating of the distance information signals and outputs the results of the integrating to the CPU 19 (SOUT signal). The CPU 19 determines a distance to the object 30 based on the SOUT signal and controls the lens drive circuit 17 so as to set the lens 18 into an in-focus state.

Figure 4:
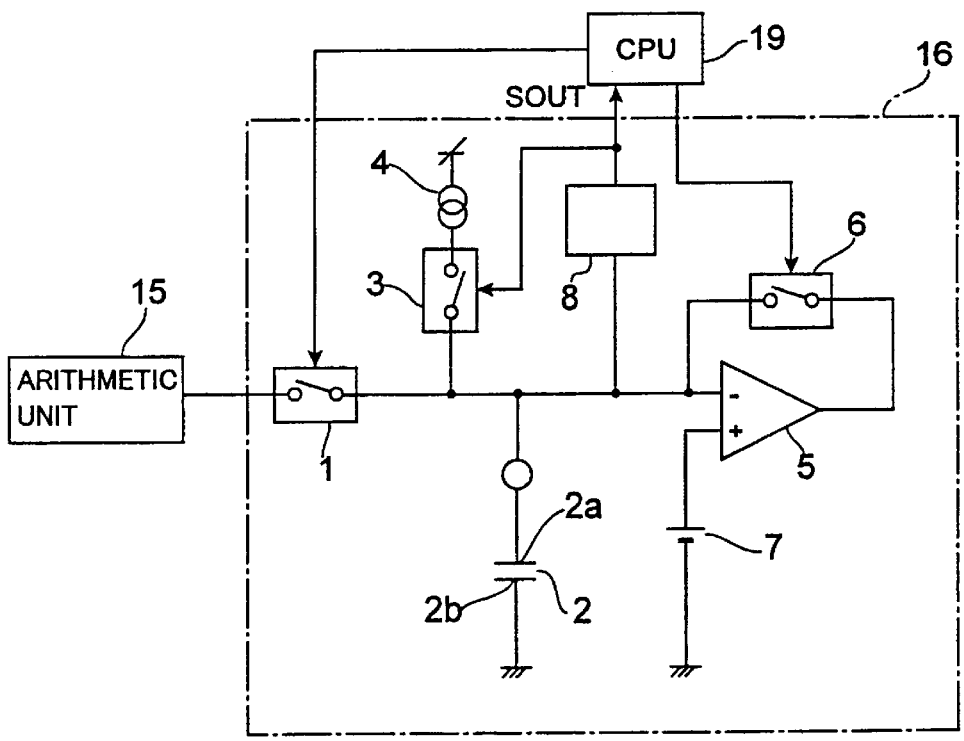
FIG. 4 is a circuit diagram of a typical integrating unit used in the distance measurement system.
Figure 5:
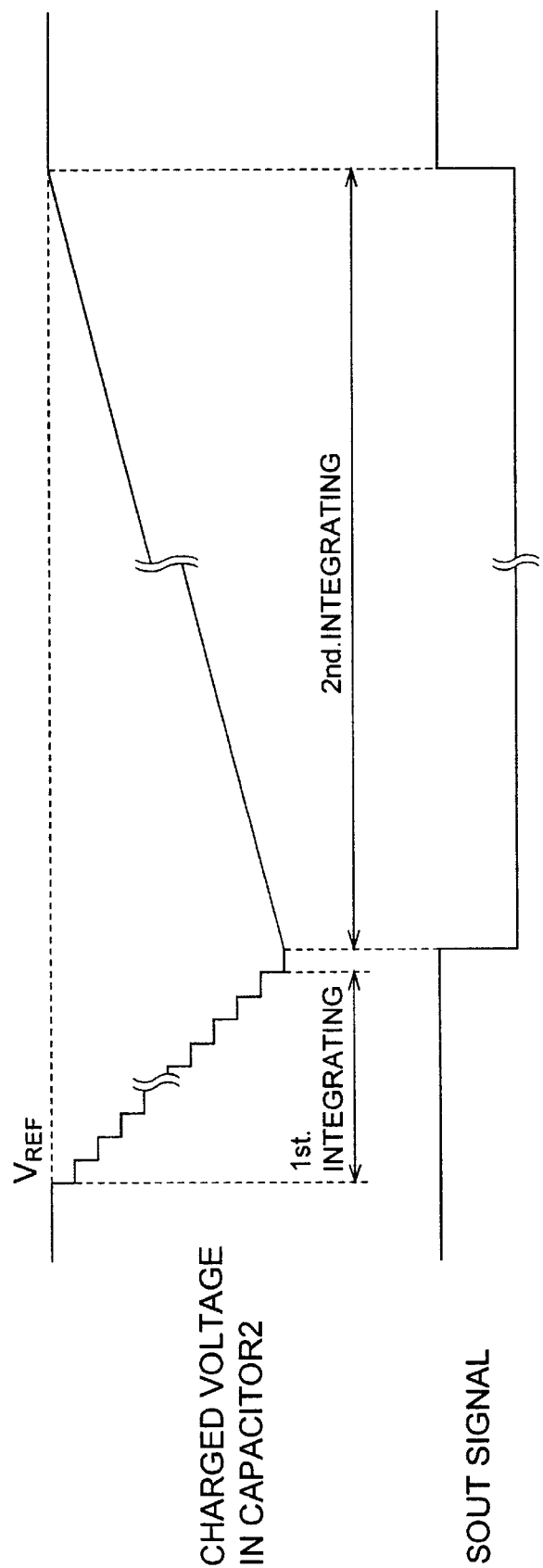
FIG. 5 is a timing chart for explaining the operation of the prior distance measurement system.

Next, the details of the integrating unit 16 will be explained below. As the integrating unit 16 used in the present embodiment may be substantially consistent with that of the prior art, it will be explained with FIG. 4. The integrating unit 16 comprises a switch 1, integrating capacitor 2, switch 3, constant current source 4, operational amplifier 5, switch 6, reference power supply 7, and a comparator 8. The negative input terminal of the operational amplifier 5 is connected through the switch 1 to the output terminal of the arithmetic unit 15 and grounded through the integrating capacitor 2. Also, the negative terminal of the amplifier 5 is connected through the switch 3 to the constant current source 4, and through the switch 6 to the output terminal of the operational amplifier 5. The positive input terminal of the operational amplifier 5 is connected to the reference power supply 7, which provides a reference voltage $V_{REF}$. The comparator 8 is connected to the junction between the negative terminal of the operational amplifier 5 and the integrating capacitor 2 and compares the potential of the junction and the reference voltage $V_{REF}$. The comparator 8 outputs the SOUT signal represented the results of the comparison. The SOUT signal is asserted low, if a charged voltage in the integrating capacitor 2 is below the reference voltage $V_{REF}$ during the period of the second integration, and asserted high, if the voltages are equal with each other. The CPU 19 receives the SOUT signal output from the comparator 8 and controls the on-off operation of the switches 1, 3 and 6.

The operation of the distance measurement system according to the preferred embodiment would be explained hereinafter with reference to FIG. 2, which shows a timing chart for explaining the operation of the distance measurement system according to the embodiment. When the shutter release button is half depressed, a series of distance measuring procedures start. The IRED 10 is driven by an emission timing signal having a duty ratio output from the CPU 19 to the driver 11 and emits a predetermined series of infrared pulses. These infrared pulses are reflected by the object 30 and received by the PSD 12. The arithmetic unit 15 outputs the data of output ratio $I_1/(I_1+I_2)$ for each pulse and the data is input into the integrating unit 16 as a distance information signal. The CPU 19 controls the switch 1 at the timing corresponding to the pulse emission of the IRED 10 to cause a negative voltage corresponding to the output ratio to be input into the integrating capacitor 2.

Thus, into the integrating capacitor 2 of the integrating unit 16, the distance information signals output from the arithmetic unit 15 are input, and the capacitor 2 discharges by an amount corresponding to the voltage level represented each distance information signal. In other words, the charged voltage in the integrating capacitor 2 decreases step by step, whenever receiving each distance information signal (first integrating). A charged voltage drop per each step may represent each distance information. Thus, the integrating unit 16 adds up the distance information obtained from all the series of pulses.

After the inputs just corresponding in number to the predetermined number of pulses into the integrating capacitor 2 has completed, the switch 6 is maintained off. However, the switch 3 is turned on by the signal from the CPU 19. This causes the integrating capacitor 2 to be charged at a predetermined speed determined by the power rating of the constant current source 4 (second integrating). During the period of the second integrating, the comparator 8 compares the charged voltage in the integrating capacitor 2 and the reference voltage $V_{REF}$. The comparator 8 outputs the results of the comparison as the SOUT signal. The CPU 19 monitors a length of time required to complete the second integrating based on the SOUT signal.

If the period of the second integrating obtained based on the SOUT signal is shorter than a predetermined maximum period, the CPU 19 obtains the distance to the object 30 from the period of the second integrating, with the aid of the sum of the distance information signals input into the integrating capacitor 2 during one distance measurement operation. At the end of the second integrating, the comparator 8 causes the switch 3 to be turned off and the charging of the integrating capacitor 2 stops.

Figure 2:
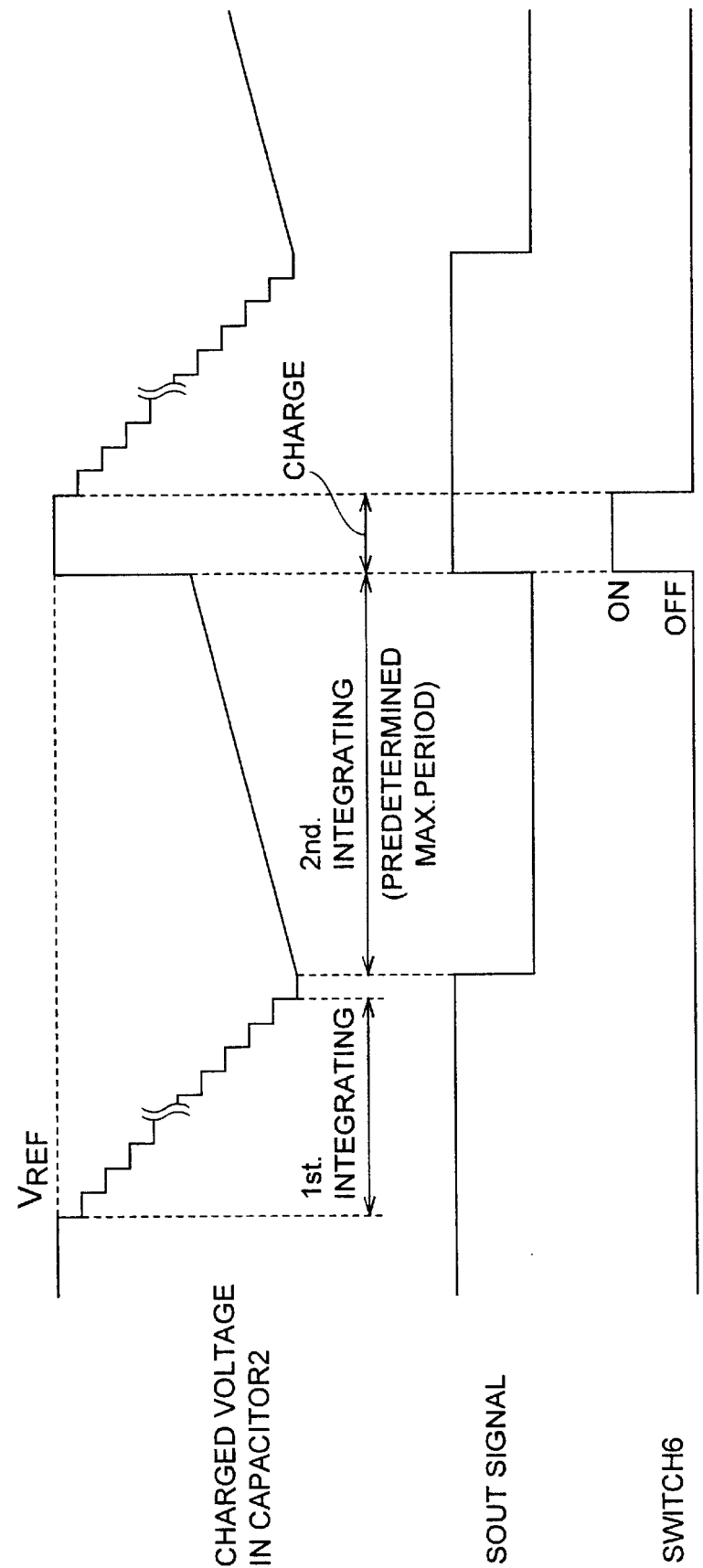
FIGS. 2 and 3 are timing charts for explaining the operation of the embodiment shown in FIG. 1.

However, as will be understood from FIG. 2, if the period of the second integration obtained based on the SOUT signal exceeds predetermined maximum period, the CPU 19 detects such an exceeding and causes the switch 3 to be turned off when predetermined maximum period ends to stop the second integrating. This prevents the second integrating from being ineffectively performed for a long period of time, resulting in a short time lag. Furthermore, the CPU 19 informs a photographer that the shooting has not performed successfully by so indicating on a camera display (not shown) and/or issuing an alarm sound, thus urging the photographer to take proper action. As the CPU 19 determines the distance to the object 30 based on the predetermined maximum period, an error in distance measurement may be minimized. Furthermore, in a case where the distance measurement is performed repeatedly, a proper distance measuring operation can be expected in each succeeding distance measurement, provide that the CPU 19 causes the switch 6 to be turned on and the integrating capacitor 2 to be charged to the reference voltage $V_{REF}$ before the start of the succeeding distance measurement.

The predetermined maximum period can be determined from an expected distance to an object to be measured. For example, the predetermined maximum period is determined based on the maximum value of a signal output from the arithmetic unit 15. Also, for example, in a continuous distance measurement in which multiple distance measuring operations are performed for one shutter brelease manipulation, the predetermined maximum period can be determined based on the period of the second integrating obtained in the preceding distance measuring operation.

Subsequently, the shutter release button is fully depressed and then the CPU 19 operates to control the lens drive circuit 17 based on the determined distance so as to appropriately adjust the focus of the lens 18. Also, a shutter (not shown) opens causing exposure film to light. In this manner, the shutter release manipulation can be followed by the aforementioned series of shooting procedures comprising the preliminarily charging, distance measuring (first and second integrating), focussing and exposing.

Figure 3:
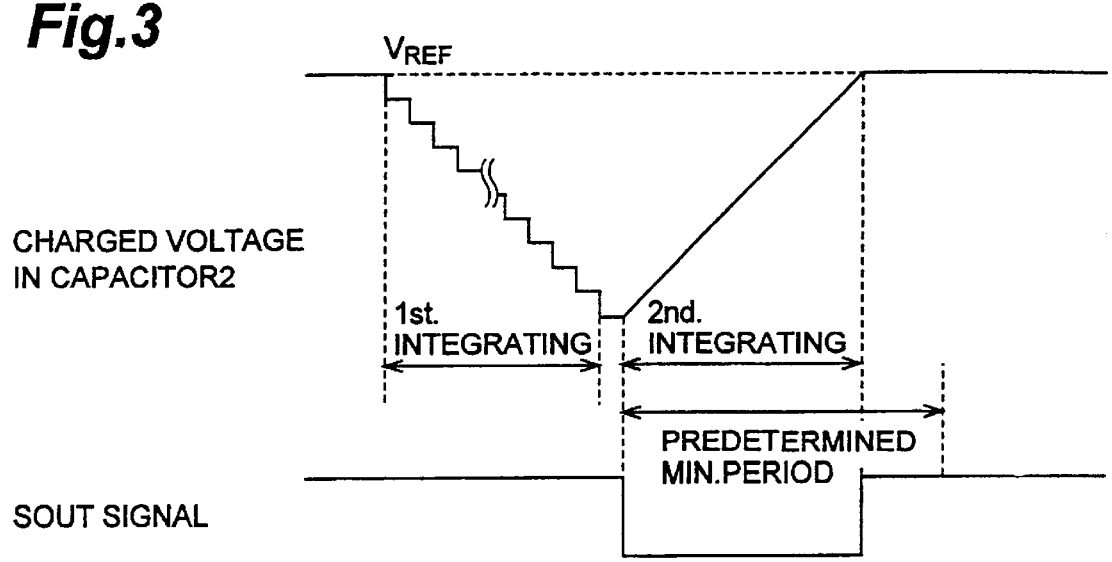

It is understood from the foregoing that the invention has been explained with respect to the embodiment in which the period of the second integration is longer than the predetermined maximum period. However, the invention may be applied to such a modification, in which the period of the second integrating is shorter than the predetermined minimum period. The modification will be explained hereinafter with refference to FIG. 3, which is a view showing a timing chart with respect to the operation of the modification.

If the period of the second integrating obtained based on the SOUT signal is shorter than the predetermined minimum period (a minimum second integrating period), the CPU 19 detects this fact. The CPU 19 informs a photographer that the shooting has not performed successfully by so indicating on a camera display (not shown) and/or issuing an alarm sound, thus urging the photographer to take proper action. As the CPU 19 determines the distance to the object 30 based on the predetermined minimum period, an error in the distance measurement may be minimized.

The predetermined minimum period can be determined from an expected distance to an object to be measured. For example, the predetermined minimum period is determined based on the minimum value of a signal output from the arithmetic unit 15. Also, for example, in a continuous distance measurement in which multiple distance measuring operations are performed for one shutter release manipulation, the predetermined minimum period can be determined based on the period of the second integrating obtained in the preceding distance measuring operation.

The present invention is not limited to the aforementioned embodiments and many modifications can be made thereto. For example, the invention is also applicable to a system including such an integrating unit, in which charging and discharging of an integrating capacitor are carried out in a manner contrary to that in the aforementioned embodiments. That is, during the period of the first integration, the integrating capacitor 2 may be charged so that the voltage level thereof ascends step by step and then discharged at a time in the second integration.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An active distance measurement system comprising:

a light source for emitting a series of light pulses toward an object at a distance to be measured;

a position sensitive detector for detecting light pulses emitted by said light source and reflected from the object and outputting signals, each signal corresponding to a position where a light pulse reflected from the object is detected;

an arithmetic unit for outputting signals, each signal corresponding to the distance to the object, in response to the signals output from said position sensitive detector;

an integrating unit including an integrating capacitor, and a comparator comparing a voltage on said capacitor with a reference voltage and outputting a compared signal representing a result of comparing, said integrating unit performing a first integration during which said integrating capacitor is discharged or charged in response to the signals output from said arithmetic unit, and a second integration during which said integrating capacitor is charged or discharged at a fixed speed, until the earlier of (i) the voltage on said integrating capacitor reaching a reference voltage and (ii) elapsing of a maximum time period; and a distance detecting unit for detecting a measured distance to the object based on elapsed time of the second integration only when the elapsed time of the second integration does not exceed the maximum time period.

2. The distance measurement system according to claim 1, wherein said distance detection unit issues an alarm signal when the elapsed time of the second integration exceeds the maximum time period.

3. The distance measurement system according to claim 1, wherein when the elapsed time of the second integration exceeds the maximum time period, said distance detection unit detects, as the distance to the object, a distance based on the maximum time period.

4. The distance measurement system according to claim 1, wherein if the elapsed time of the second integration is shorter than a minimum time period, said distance detection unit detects, as the distance to the object, a distance based on the minimum time period.

5. The distance measurement system according to claim 1, said integrating unit further including a charging or discharging unit setting said integrating capacitor to the reference voltage before performing a succeeding first integration, when said distance detection unit has detected that the elapsed time period of the second integration immediately preceding the succeeding first integration has reached the maximum time period.

6. The distance measurement system according to claim 4, wherein said distance detection unit issues an alarm signal when the second integration is shorter than the minimum time period.

* * * * *